C. C. RIOTTE, DEC'D.
M. L. RIOTTE, ADMINISTRATRIX.
PRESSURE REGULATED GAS VALVE FOR ENGINES.
APPLICATION FILED MAR. 1, 1909.
946,737.
Patented Jan. 18, 1910.
4 SHEETS—SHEET 1.
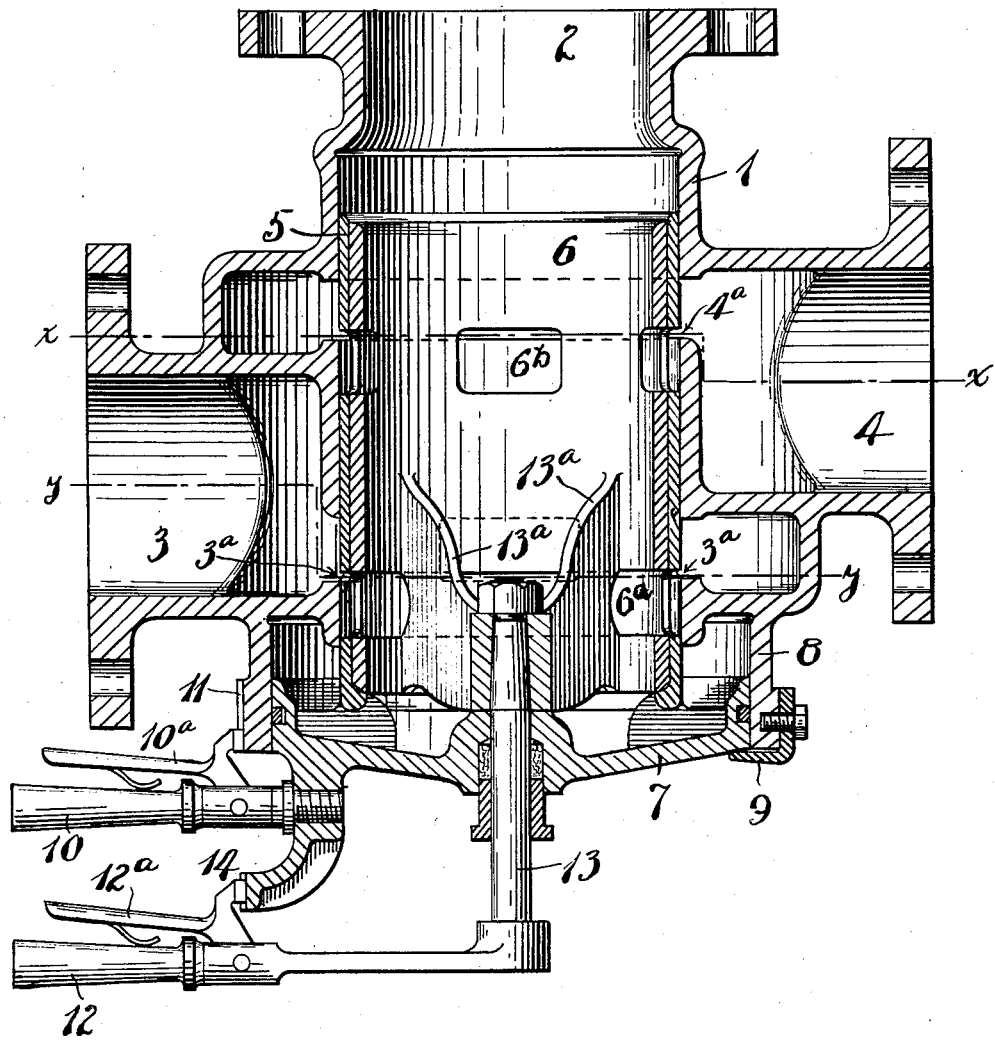

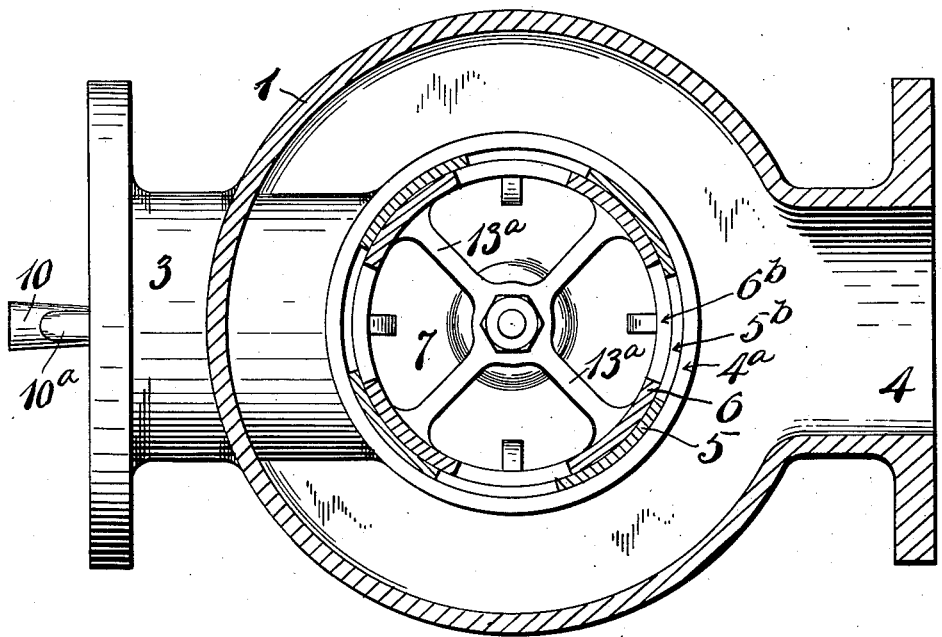
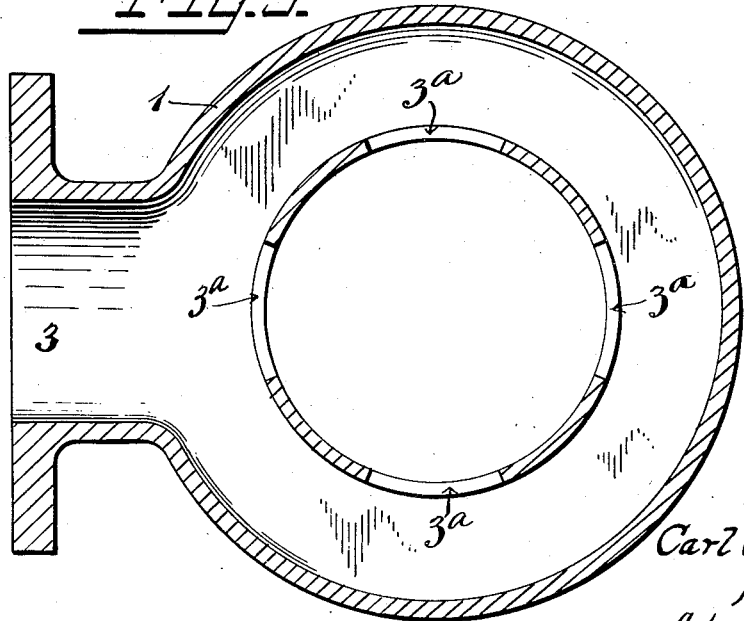

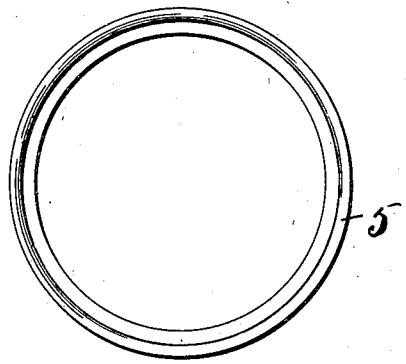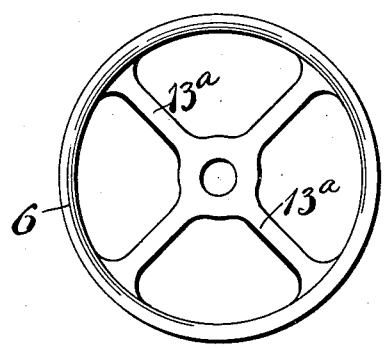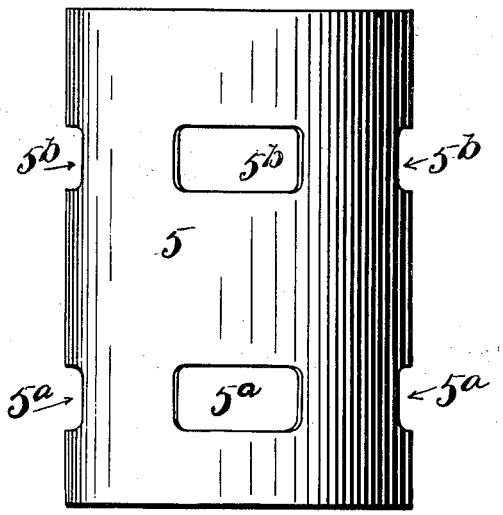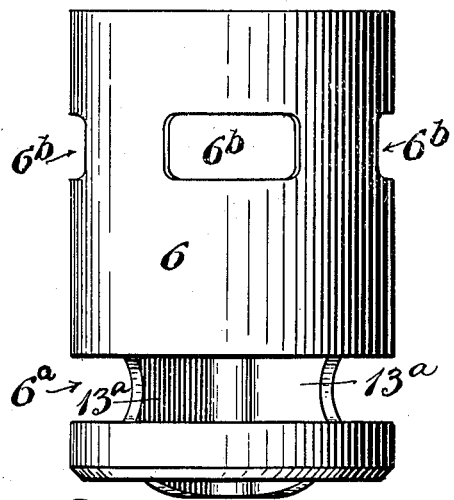

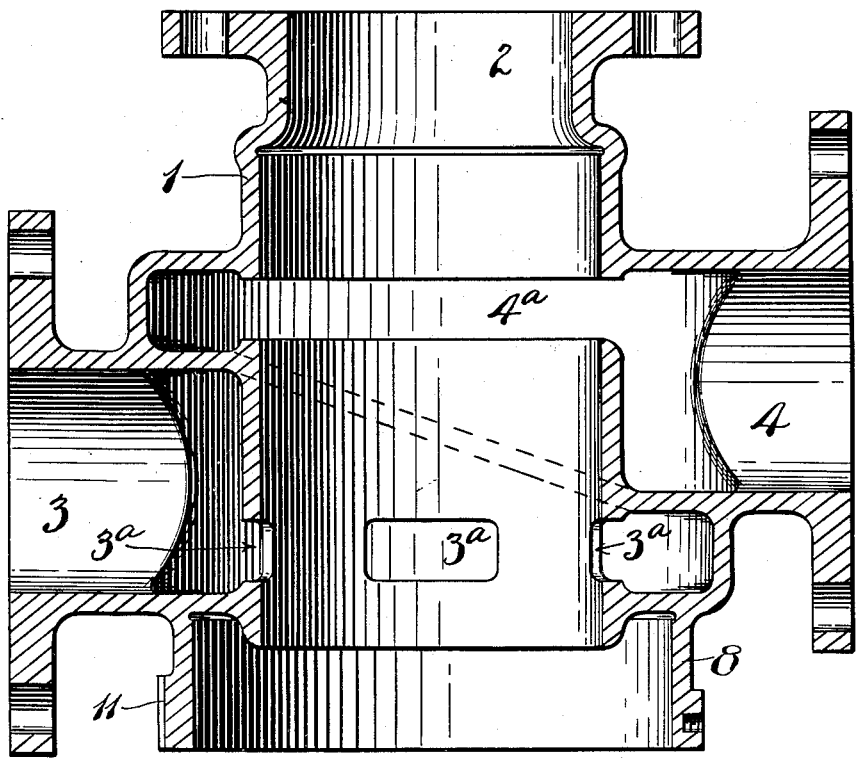

UNITED STATES PATENT OFFICE.

MARIE L. RIOTTE, OF JERSEY CITY, NEW JERSEY, ADMINISTRATRIX OF CARL C. RIOTTE, DECEASED.

PRESSURE-REGULATED GAS-VALVE FOR ENGINES.

946,737.    Specification of Letters Patent.    Patented Jan. 18, 1910.

Application filed March 1, 1909. Serial No. 480,690.

*To all whom it may concern:*

Be it known that CARL C. RIOTTE, late a citizen of the United States, has invented certain new and useful Improvements in Pressure-Regulated Gas-Valves for Engines, of which the following is a full, clear, and exact description.

This invention relates to improved gas mixing and regulating apparatus for gaseous fluids, the object of the invention being particularly designed to provide simple and effective apparatus for regulating the mixture of gas and air, whereby an explosive mixture may be formed, said apparatus when adjusted operating automatically to supply a greater or lesser quantity of the mixture without materially disturbing the proportions established by the original manual setting. If it is desirable at any time to vary these proportions, this can be quickly accomplished in a very effective and simple manner. These and other advantages will be apparent to the mechanic skilled in the art from a reading of the following specification.

In the drawings, Figure 1 is a side elevation mainly in vertical section illustrating various parts of the improved mixing and regulating apparatus assembled. Fig. 2 is a section on the plane of the line $x$—$x$ of the parts shown in Fig. 1. Fig. 3 is a section on the plane of the line $y$—$y$ Fig. 1 of the main frame with the valves omitted. Fig. 4 is a plan view of the air valve with the piston removed. Fig. 5 is a side elevation of the valve portion shown in Fig. 4. Fig. 6 is a plan view of the gas valve. Fig. 7 is a side elevation thereof. Fig. 8 is a vertical sectional view of the casing or valve housing with all parts removed.

1 is the casing or housing having the mixture outlet 2, the air inlet 3, and the gas inlet 4. The central part of the housing contains a valve chamber communicating directly with the mixture outlet 2 and under the same.

The housing 1 is preferably chambered so as to provide a space in open communication with air inlet 3 and extending around the valve chamber. This space communicates with the interior of the valve chamber by the ports $3^a$ (see Fig. 8). The housing 1 is also chambered to provide a gas space around the valve chamber and in open communication with the gas inlet 4. This chamber communicates with the valve space through the open slot $4^a$ which extends around the wall of the valve chamber for the purpose hereinafter explained.

Referring to Fig. 1, 5 is the air valve in the form of an open-ended sleeve. 6 is the gas valve also in the form of an open-ended sleeve. The valve 5 has a sliding and rotatable fit in the valve chamber of the housing 1. The valve 6 has a rotatable fit within valve 5. 7 is a piston connected to the lower end of the air valve 5 and movable up and down in the cylinder 8 at the lower end of the casing 1. 9 is a stop to limit the downward excursion of said piston. 10 is an operating handle connected to piston 7 and provided with a suitable locking handle $10^a$, arranged to engage in a toothed quadrant 11 on the outer side of the cylinder 8. By operating the handle 10, the air valve 5 may be turned upon its axis for the purpose hereinafter described, the piston 7 acting as a coupling between handle 10 and valve 5. 12 is a handle connected to a shaft 13 which passes through the piston 7 and is connected at its upper end with the gas valve 6 through the medium of spider flanges $13^a$. This handle 12 may also have a locking handle $12^a$ arranged to engage in the toothed quadrant 14 carried by the piston 13. By means of the handle 12, the gas valve 6 may be turned axially.

From the foregoing it will be seen that both the valves 5 and 6 may be independently controlled by the handles 10—12. It will also be seen that they may slide bodily up and down in the valve chamber, this movement occurring with the rise and fall of piston 7. The teeth of the quadrant 11 are of such height as to permit this rising and falling movement of said parts without endangering the disconnection of the locking handle $10^a$ from said quadrant.

The valves 5 and 6 are provided with ports and passages as follows, reference being particularly made to Figs. 4 to 7. The valve 5 is provided with the air inlet ports $5^a$, which preferably correspond in shape and size to the air admission ports $3^a$ (Fig. 8) in the wall of the valve chamber. This air valve 5 also has gas admission ports $5^b$, which may be of similar size and arrangement as the ports 5ᵃ, but being of a higher elevation. The gas valve 6 is provided with an annular opening 6ᵃ arranged on the same plane with the ports 5ᵃ in the air valve. The gas valve 6 also has the ports 6ᵇ arranged on the same plane with the ports 5ᵇ in the surrounding air valve and preferably of the same size and shape.

In operation; assuming the parts stand in their lowermost position, indicated in Fig. 1, wherein it may be assumed the minimum demand is being made for gas and air, the user has simply to operate the hands 10—12 to adjust the mixture so that the proper proportion of gas and air will be brought together. By operating the handle 10, he may shift the air valve 5 so as to cut off to a greater or less extent the size of the passage through the air admission ports 3ᵃ—5ᵃ. By shifting the handle 12, he may turn the gas valve 6 within the valve 5 so as to vary the size of the passage through the gas ports 6ᵇ—5ᵇ. By this adjustment, exactly the desired proportion of gas relatively to air may be admitted to the mixing space within the valves, from which space the mixture will flow through the outlet 2 to its destination. It will be observed that the position of the valves shown in Fig. 1 operates to reduce the size of the air openings as well as the gas openings; said valves being shown in the lowermost position and the openings being contracted to minimum size suitable for a minimum supply of mixture. If a heavier demand is made, the greater suction within the mixing chamber, which communicates with the interior of the cylinder 8, draws the piston 7 upwardly, lifting the valves 5 and 6 bodily therewith and thereby opening automatically the air passages and gas passages correspondingly. This upward movement of the valves will not disturb the relative adjustment of said valves so that the same quantities of gas and air will be admitted. If for any reason it becomes desirable to modify the proportions while a larger demand is being made, this may be accomplished while the parts are bodily elevated quite as well as when the parts are in the position shown in Fig. 1, so that the operator may have perfect control of the apparatus at all times.

While various modifications of this apparatus may be easily effected by the mechanic skilled in the art, it should be understood that the construction illustrated in the accompanying drawings is a preferred one only, and while it possesses many advantages, it is capable of variation and modification without departure from the spirit and scope of the invention.

What is claimed is:

1. In a mixing and regulating apparatus for gas and air, a housing having an outlet, an air inlet and a gas inlet, two cut-off devices mounted one within the other and manually adjustable relatively to each other and to said air and gas inlets to vary the relative proportions of gas and air passing to said outlet and mutually adjustable to permit the passage of a greater or lesser quantity of gas and air to said outlet without varying substantially the proportions determined by manual adjustment both of said cut-offs and the housing having ports arranged to register simultaneously and directly with each other.

2. In a mixing and regulating apparatus, for gas and air, a casing having an outlet, separate air and gas inlets, two separate cut-off devices mounted one within the other adjustable by rotation relatively to each other and to said air and gas inlets to vary the proportion of air and gas passing said cut-offs, said cut-offs being mutually operable to vary the volume of air and gas admitted without varying the relative proportions determined by previous manual adjustment both of said cut-offs and the housing having ports arranged to register simultaneously and directly with each other.

3. In a mixing and regulating apparatus, a casing having a cylindrical chamber, an outlet therefrom, separate air and gas inlets thereto, a cut-off sleeve mounted therein for rotation and reciprocation, a second cut-off sleeve mounted within the first cut-off sleeve for rotation only relatively to the latter, air and gas ports in both of said sleeves registering respectively with the air and gas entrances in said casing.

4. In a mixing and regulating apparatus, a casing having a cylindrical chamber, an outlet therefrom, separate air and gas inlets thereto, a cut-off sleeve mounted therein for rotation and reciprocation, a second cut-off sleeve mounted within the first cut-off sleeve for rotation only relatively to the latter, air and gas ports in both of said sleeves registering respectively with the air and gas entrances in said casing, manual means for rotating said sleeves independently and automatic means for reciprocating said sleeves dependently.

5. A mixing and regulating apparatus for gas and air comprising a casing having an outlet at the end and separate air and gas inlets at the side but in different horizontal planes, two separate cut-off devices mounted one within the other both having ports registering with each other and with said air and gas inlets, and means whereby said cut-off devices may be manually adjusted relatively to each other in one plane and may be automatically adjusted mutually relatively to the casing in another direction, said automatic means being controllable by the pressure at the outlet.

6. In a mixing and regulating apparatus for gaseous fluids, an outlet, two separate inlets arranged one above the other for gaseous fluids, two cut-offs arranged in the casing and one within the other, two separate sets of ports in both of said cut-offs adapted respectively to each other and to the gas inlets of the casing, means for manually adjusting said cut-offs relatively to each other and to the inlet ports in the casing, and means for automatically adjusting the position of both of said cut-offs simultaneously relatively to said admission ports.

7. In a mixing and regulating apparatus for gaseous fluids, an outlet, two separate inlets arranged one above the other for gaseous fluids, two cut-offs arranged one within the other and in the casing, two separate sets of ports in both of said cut-offs adapted respectively to each other and to the gas inlets of the casing, means for manually adjusting said cut-offs relatively to each other and also to the inlet ports in the casing, and means for automatically adjusting the position of both of said cut-offs simultaneously relatively to said admission ports, said automatic means comprising a piston connected to both of said cut-offs, whereby both cut-offs and piston will move mutually during automatic adjustment.

MARIE L. RIOTTE,
*Administratrix of the estate of Carl C. Riotte, deceased.*

Witnesses:
 CARL GRALOR,
 CATHERINE L. HALL.